(12) United States Patent
Chan

(10) Patent No.: US 8,590,655 B2
(45) Date of Patent: Nov. 26, 2013

(54) PEDAL DRIVEN APPARATUS HAVING A MOTOR

(75) Inventor: Yet Chan, Kowloon (HK)

(73) Assignee: Foster Assets Corporation, Kwun Tong (HK)

( * ) Notice: Subject to any disclaimer, the term of this patent is extended or adjusted under 35 U.S.C. 154(b) by 123 days.

(21) Appl. No.: 12/691,991

(22) Filed: Jan. 22, 2010

(65) Prior Publication Data

US 2011/0180341 A1 Jul. 28, 2011

(51) Int. Cl.
*B62K 11/00* (2013.01)

(52) U.S. Cl.
USPC .................. 180/206.4; 180/205.1; 180/206.1

(58) Field of Classification Search
USPC .................................. 180/205.1, 206.1, 206.4
See application file for complete search history.

(56) References Cited

U.S. PATENT DOCUMENTS

| | | | | |
|---|---|---|---|---|
| 6,196,347 B1 * | 3/2001 | Chao et al. | ................. | 180/206.2 |
| 6,296,072 B1 * | 10/2001 | Turner | ........................... | 180/220 |
| 6,672,418 B1 * | 1/2004 | Makino | ....................... | 180/206.3 |
| 7,273,123 B2 * | 9/2007 | Perng | .......................... | 180/206.4 |
| 7,766,114 B2 * | 8/2010 | Lee et al. | .................... | 180/206.4 |
| 2010/0051373 A1 * | 3/2010 | Lee et al. | ...................... | 180/205 |

* cited by examiner

*Primary Examiner* — Kevin Hurley
*Assistant Examiner* — Michael Stabley
(74) *Attorney, Agent, or Firm* — Renner Kenner Greive Bobak Taylor & Weber

(57) ABSTRACT

A hybrid bicycle is provided which can be manually propelled, but which includes a motor unit for also causing forward propulsion of the bicycle. The bicycle comprises manually operable pedals fixed for rotation with a pedal spindle for receiving a manually provided driving force and a motor having a shaft for receiving a motor provided driving force. A first torque transmission path is provided for transferring the manually provided driving force to a sprocket of the pedal driven apparatus and a second torque transmission path is provided for transferring the motor provided driving force to said sprocket of the pedal driven apparatus. A first one way drive means is also provided. This is provided in the first torque transmission path between the pedal spindle and the sprocket such that when the sprocket is being driven by the motor provided driving force through the second torque transmission path, the pedal spindle is able to freewheel. The second torque transmission path may include a gear mechanism mechanically coupling the motor shaft to the sprocket of the pedal driven apparatus. The gear mechanism has a reduction gear ratio and operates to transfer the motor provided driving force from the motor shaft to the sprocket at said reduction gear ratio. The motor may be arranged concentrically around a pedal spindle of the pedal driven apparatus such that the pedal spindle is freely accommodated through a hollow bore of the motor shaft and such that their axes of rotation are parallel and preferably co-incident.

27 Claims, 10 Drawing Sheets

FIG.3   B-B

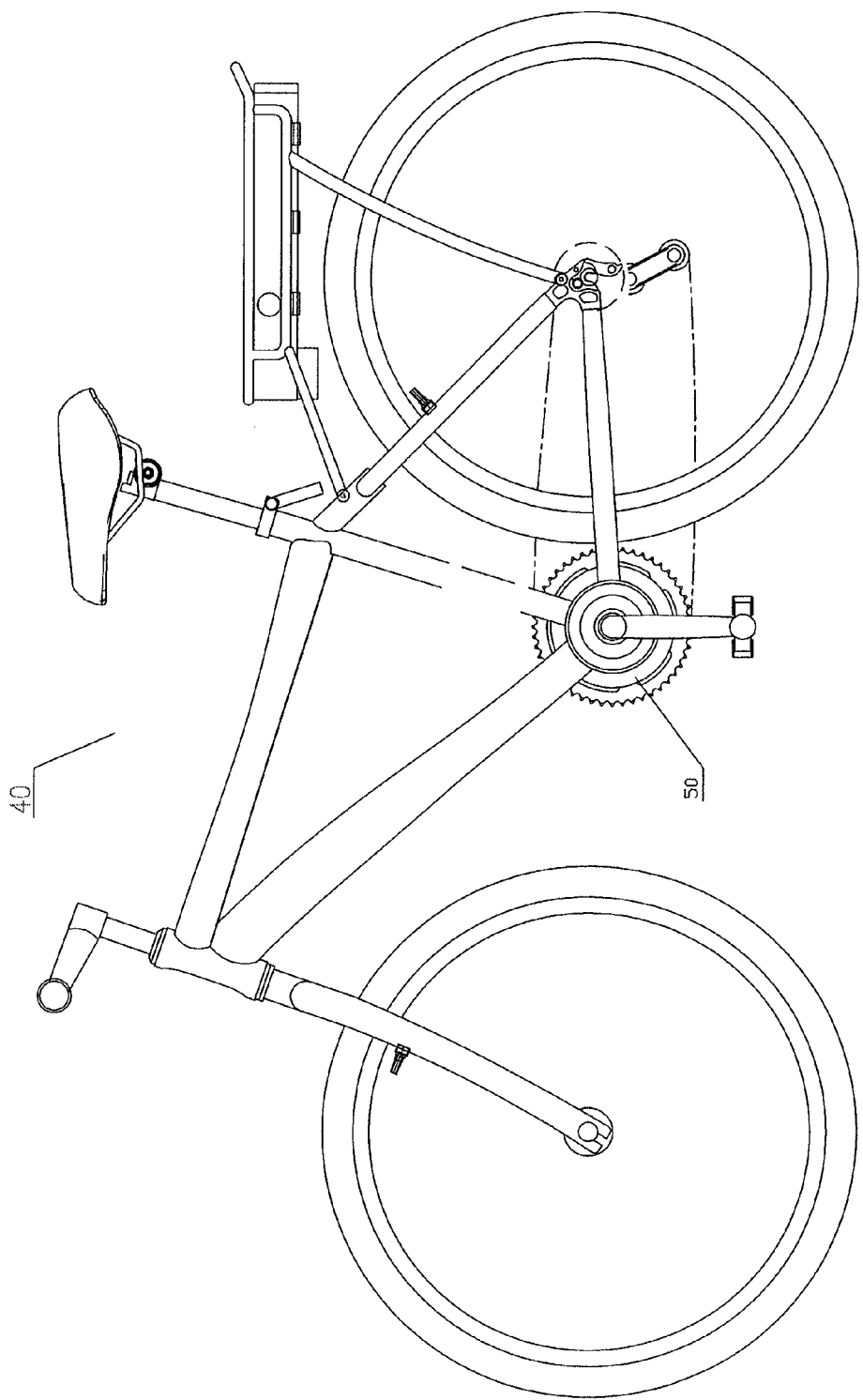

PEDAL DRIVEN APPARATUS HAVING A MOTOR

FIELD OF THE INVENTION

The invention relates to a pedal driven apparatus which can be manually propelled, but which includes a motor unit for also causing forward propulsion of the apparatus. The invention relates particularly, but not exclusively, to pedal driven wheeled apparatuses or vehicles such as bicycles having an electric motor powered by a battery pack carried on the vehicle.

BACKGROUND OF THE INVENTION

It is known to provide some manually propellable wheeled vehicles or apparatuses such as bicycles with a motor unit to assist a user in powering the apparatus, especially up sloping terrain, e.g. hills, although the motor unit may sometimes used by itself to power the bicycle over any terrain.

It is also known to utilize an in-wheel motor in an electric motor assisted bicycle such that a transmission can be omitted and the resulting apparatus is easy and simple to manufacture. For such a known electric motor assisted bicycle using an in-wheel motor, it can be manufactured by simply replacing a hub of one wheel with an in-wheel motor, while the pedals drive the rear wheel through a sprocket and a chain in a generally conventional manner. In such an arrangement, no motor drive force need be transferred through the bicycle chain. Therefore, a pedal driving force and a motor driving force are delivered quite separately from each other.

One consequence of the known in-wheel motor arrangement is that it is not feasible for an in-wheel electric motor assisted bicycle to be developed with additional functions such as gear shifting, operating with a clutch, functioning as an exercise bicycle, or using the motor to generate power, i.e. it does not afford easy expansion of its functions. It also creates production and assembly problems as well as replacement parts problems. Where an in-wheel motor fails or requires maintenance, for example, it requires the wheel to be removed thus disabling the bicycle. Under some motor failure or maintenance conditions, it may no longer be possible to rotate the wheel accommodating the in-wheel motor such that it is not even possible to propel the bicycle under manually applied pedal power.

In addition to the known electric bicycle using an in-wheel motor, there is at least one other type of electric bicycle which uses a wheel-driving motor. However, in this type of electric bicycle, a motor driving force and a pedal driving force are also separately delivered from each other. This type of electric bicycle has similar disadvantages in that gear shifting can not be easily realized using a rear wheel transmission when the electric bicycle is being propelled using the wheel-driving motor.

The foregoing are just some of the common problems encountered with conventional hybrid motor assisted pedal driven apparatuses such as bicycles.

OBJECTS OF THE INVENTION

An object of the invention is to provide an improved pedal driven apparatus having a motor unit.

Another object of the invention is to provide an improved electric motor assisted bicycle.

Another object of the invention is to mitigate or obviate to some degree one or more problems associated with known hybrid bicycles or pedal driven apparatuses.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect of the invention, there is provided a pedal driven apparatus comprising: manually operable pedals fixed for rotation with a pedal spindle for receiving a manually provided driving force; a motor having a shaft for receiving a motor provided driving force; a first torque transmission path for transferring the manually provided driving force to a sprocket of the pedal driven apparatus; a second torque transmission path for transferring the motor provided driving force to said sprocket of the pedal driven apparatus; wherein a first one way drive means is provided in the first torque transmission path between the pedal spindle and the sprocket such that when the sprocket is being driven by the motor provided driving force through the second torque transmission path, the pedal spindle is able to freewheel.

An advantage of this arrangement is that it is not necessary to provide a freewheel sprocket on the rear wheel of a bicycle having a motor and sprocket assembly as defined by the first main aspect of the invention for a pedal driven apparatus. This is because the first one way drive means provides this function in addition to enabling the pedal spindle to freewheel when the motor drive is operating.

The motor may be arranged concentrically around the pedal spindle such that the pedal spindle is freely accommodated through a hollow bore of the motor shaft and such that their axes of rotation are parallel. The pedal spindle and the motor shaft preferably share the same axis of rotation.

This arrangement results in a neat and compact integration of the motor with the pedal spindle and sprocket assembly.

The first torque transmission path may comprise the manually operable pedals, the pedal spindle to which the pedals are affixed for rotation therewith, and the first one way drive means, wherein the first one way drive means mechanically couples the pedal spindle to the sprocket such that the first one way drive means transfers the manually provided driving force applied to the pedals to the sprocket to cause rotation of the sprocket and wherein the first one way drive means allows the pedal spindle to freewheel when the sprocket is being driven by the motor shaft. Preferably, the first one way drive means comprises a freewheel device such as an over-running bearing or an over-running clutch or any device suitable for enabling drive to be applied through an output member of the one way drive means, but for an input member to freewheel when no drive is being transferred through said first one way drive means.

The first one way drive means may be associated with one of the manually operable pedals affixed to the pedal spindle for rotation therewith, said one of the pedals comprising one of two pedals which is affixed to an end of the pedal spindle on a sprocket side of the pedal driven apparatus.

The second torque transmission path may comprise the motor shaft and a gear mechanism mechanically coupling the motor shaft to the sprocket, wherein the gear mechanism has a reduction gear ratio and operates to transfer the motor provided driving force from the motor shaft to the sprocket at said reduction gear ratio. The gear mechanism may comprise a planetary gear mechanism having a planet gear whose axis of rotation is offset by a predetermined amount with respect to the axis of rotation of the motor shaft.

This allows a high speed motor to be employed whereby the gear mechanism applies a suitable reduction gear ratio to the output shaft of the motor to rotate the sprocket at high torque and low speed (relatively speaking when compared to the motor shaft speed of rotation).

The planet gear may be rotatably supported on an eccentric wheel whereby the planet gear is made to rotate as the eccentric wheel rotates and whereby the position of the axis of rotation of the planet gear changes relative to the axis of rotation of the motor shaft as the planet gear rotates such that the varying position of the axis of rotation of the planet gear defines a circle centred on the axis of rotation of the motor shaft, said circle having a radius equal to the predetermined offset amount. The planet gear may have a smaller diameter than an internal ring gear within which it locates for rotation therewithin, the internal ring gear being fixed in position and having a central axis co-incident with the axis of rotation of the motor shaft, the planet gear having a smaller number of teeth than the internal ring gear. The planet gear may be rotatably supported on the eccentric wheel by a bearing or a bush.

The planet gear rotates around the inner toothed surface of the inner ring gear such that the outer toothed surface of the planet gear meshes with only a small number of teeth of the inner ring gear at any point of time.

A planet gear carrier of the planetary gear mechanism may be configured to transfer the motor provided driving force to the sprocket.

Using a planet gear carrier of the gear mechanism in this way provides a neat and efficient way of mechanically transferring the motor driving force to the sprocket assembly.

The planetary gear mechanism may include a counterbalance member which is configured to counterbalance an imbalance of weight caused by the offsetting of the planet gear with respect to the axis of rotation of the motor shaft. The counterbalance member may comprise a generally semi-circular weighted member which is arranged to rotate with the planet gear so as to counterbalance the planet gear when the planet gear is rotating.

Preferably, the planetary gear mechanism does not include a weighted counterbalance member, but comprises first and second identical planet gears arranged half a revolution out of phase with each other such that said first and second planet gears counterbalance each other on rotation. Preferably also, the first and second planet gears are located for rotation half a revolution out of phase with each other within a common, single internal ring gear. Each of the first and second planet gears may be supportably mounted on respective first and second eccentric wheels.

The use of two out of phase planet gears negates the need to provide a weighted counterbalance member and provides a balanced system which transfers motor driving force to the sprocket assembly more efficiently and quietly than the foregoing arrangement including a weighted counterbalance.

The planet gear carrier may be affixed to the sprocket for rotation therewith. The planet gear carrier may also be affixed to an output member of the first one way drive means for rotation therewith, whereby the manually provided driving force applied to the pedals is transferred via the first torque transmission path to the motor shaft through the planetary gear mechanism as well as to the sprocket.

In this arrangement, a user can, through use of a control mounted, for example, on the handlebar of the bicycle or any manually accessible location on the pedal driven apparatus, control the motor to act as a power generator. The user may operate a switch to control the motor to use mechanical power being provided manually through the pedals and which causes the motor shaft to rotate to generate electric power for recharging the motor battery pack or powering lights, for example.

Preferably, the gear mechanism comprises a toothless planetary gear mechanism having a toothless planet gear whose axis of rotation is offset by a predetermined amount with respect to the axis of rotation of the motor shaft and wherein the reduction gear ratio of the toothless planetary gear mechanism is defined by a relationship between the respective diameters of the toothless planet gear and a toothless internal ring gear within which the planet gear is located for rotation, the toothless planet gear having a smaller diameter than the toothless internal ring gear.

The advantage of a toothless planetary gear mechanism is one of quietness. The lack of gear teeth and the reliance on contact between generally smooth surfaces to effect a transfer of power from the motor to the sprocket results in very quiet operation and more efficient power transfer as there is no slippage between gear teeth as can occur in toothed gear mechanisms.

The toothless planet gear may be rotatably supported on an eccentric wheel whereby the toothless planet gear is made to rotate as the eccentric wheel rotates and whereby the position of the axis of rotation of the toothless planet gear changes relative to the axis of rotation of the motor shaft as the toothless planet gear rotates such that the varying position of the axis of rotation of the toothless planet gear defines a circle centred on the axis of rotation of the motor shaft, said circle having a radius equal to the predetermined offset amount.

The toothless internal ring gear may be fixed in position and may have a central axis co-incident with the axis of rotation of the motor shaft.

The toothless planet gear may be rotatably supported on the eccentric wheel by a bearing or a bushing.

A planet gear carrier of the toothless planetary gear mechanism may be configured to transfer the motor provided driving force to the sprocket.

The toothless planetary gear mechanism may includes a counterbalance member which is configured to counterbalance an imbalance of weight caused by the offsetting of the toothless planet gear with respect to the axis of rotation of the motor shaft. The counterbalance member may comprise a generally semi-circular weighted member which is arranged to rotate with the toothless planet gear so as to counterbalance the toothless planet gear when the toothless planet gear is rotating.

Preferably, the toothless planetary gear mechanism does not include a weighted counterbalance member, but comprises first and second identical toothless planet gears arranged half a revolution out of phase with each other such that said first and second toothless planet gears counterbalance each other on rotation. Preferably, the first and second toothless planet gears are located for rotation half a revolution out of phase with each other within a common, single toothless internal ring gear. Each of the first and second toothless planet gears may be supportably mounted on respective first and second eccentric wheels.

The planet gear carrier may be affixed to the sprocket for rotation therewith. The planet gear carrier may also be affixed to an output member of the first one way drive means for rotation therewith, whereby the manually provided driving force applied to the pedals is transferred via the first torque transmission path to the motor shaft through the toothless planetary gear mechanism as well as to the sprocket.

The toothless planet gear may be rotatably supported on the eccentric wheel with its axis of rotation is offset by a predetermined amount with respect to the axis of rotation of the motor shaft and located within the toothless internal ring gear such that its outer surface engages a toothless inner ring gear inner surface by heating the toothless internal ring gear and shrink fitting it over the toothless planet gear. The inner surface of the internal ring gear and/or the outer surface of the planet gear may be roughened to enhance the coefficient of friction acting between said engaged surfaces at their line of contact.

The first and second toothless planet gears are preferably rotatably supported respectively on the first and second eccentric wheels with their axes of rotation offset by a predetermined amount with respect to the axis of rotation of the motor shaft and located within a common, single toothless internal ring gear for rotation half a revolution out of phase with each other to engage a toothless inner ring gear surface by heating the toothless internal ring gear and shrink fitting it over the first and second toothless planet gears. The inner surface of the internal ring gear and/or the outer surfaces of the planet gear may be roughened to enhance the coefficient of friction acting between said engaged surfaces at their lines of contact.

Preferably, a second one way drive means is provided in the second torque transmission path between the motor shaft and the sprocket such that when the sprocket is being driven by the manually provided driving force through the first torque transmission path, the motor shaft is not caused to rotate. The second one way drive means may comprise at least one ratchet member moveably disposed on the planet gear carrier and arranged to engage a rack of a ratchet wheel fixed to rotate with the sprocket. The at least one ratchet member may have associated therewith means for resiliently biasing a free end of said ratchet member outwardly from a surface of the planet gear carrier such that said free end of the ratchet member engages a tooth in the rack of the ratchet wheel.

Preferably, the pedal driven apparatus comprises a bicycle, although the present invention is not limited to bicycles, but can be applied to any pedal driven apparatus.

The motor is preferably an electric motor powered by a battery pack carried on the pedal driven apparatus.

In a second main aspect of the invention, there is provided a motor for a pedal driven apparatus comprising: a shaft for receiving a motor provided driving force; and a gear mechanism mechanically coupling the motor shaft to a sprocket of the pedal driven apparatus, wherein the gear mechanism has a reduction gear ratio and operates to transfer the motor provided driving force from the motor shaft to the sprocket at said reduction gear ratio and wherein the motor is arranged concentrically around a pedal spindle of the pedal driven apparatus such that the pedal spindle is freely accommodated through a hollow bore of the motor shaft and such that their axes of rotation are parallel.

Preferably, the pedal spindle and the motor shaft share the same axis of rotation.

The gear mechanism preferably comprises a planetary gear mechanism having a planet gear whose axis of rotation is offset by a predetermined amount with respect to the axis of rotation of the motor shaft. The planet gear is preferably rotatably supported on an eccentric wheel whereby the planet gear is made to rotate as the eccentric wheel rotates and whereby the position of the axis of rotation of the planet gear changes relative to the axis of rotation of the motor shaft as the planet gear rotates such that the varying position of the axis of rotation of the planet gear defines a circle centred on the axis of rotation of the motor shaft, said circle having a radius equal to the predetermined offset amount.

Preferably, the planet gear has a smaller diameter than an internal ring gear within which it locates for rotation therewithin, the internal ring gear being fixed in position and having a central axis co-incident with the axis of rotation of the motor shaft, the planet gear having a smaller number of teeth than the internal ring gear. Preferably, the planet gear is rotatably supported on the eccentric wheel by a bearing.

Preferably, a planet gear carrier of the planetary gear mechanism is configured to transfer the motor provided driving force to the sprocket of the pedal driven apparatus.

The planetary gear mechanism may include a counterbalance member which is configured to counterbalance an imbalance of weight caused by the offsetting of the planet gear with respect to the axis of rotation of the motor shaft. The counterbalance member may comprise a generally semi-circular weighted member which is arranged to rotate with the planet gear so as to counterbalance the planet gear when the planet gear is rotating.

Preferably, the planetary gear mechanism does not include a weighted counterbalance member, but comprises first and second identical planet gears arranged half a revolution out of phase with each other such that said first and second planet gears counterbalance each other on rotation. Preferably, the first and second planet gears are located for rotation half a revolution out of phase with each other within a common, single internal ring gear. Preferably, the first and second planet gears are supportably mounted on respective first and second eccentric wheels.

Preferably, the gear mechanism comprises a toothless planetary gear mechanism having a toothless planet gear whose axis of rotation is offset by a predetermined amount with respect to the axis of rotation of the motor shaft and wherein the reduction gear ratio of the toothless planetary gear mechanism is defined by a relationship between the respective diameters of the toothless planet gear and a toothless internal ring gear within which the planet gear is located for rotation, the toothless planet gear having a smaller diameter than the toothless internal ring gear.

Preferably, the toothless planet gear is rotatably supported on an eccentric wheel whereby the toothless planet gear is made to rotate as the eccentric wheel rotates and whereby the position of the axis of rotation of the toothless planet gear changes relative to the axis of rotation of the motor shaft as the toothless planet gear rotates such that the varying position of the axis of rotation of the toothless planet gear defines a circle centred on the axis of rotation of the motor shaft, said circle having a radius equal to the predetermined offset amount.

Preferably, the toothless internal ring gear is fixed in position and has a central axis co-incident with the axis of rotation of the motor shaft.

Preferably, the toothless planet gear is rotatably supported on the eccentric wheel by a bearing or a bushing.

Preferably, the planet gear carrier of the toothless planetary gear mechanism is configured to transfer the motor provided driving force to the sprocket.

The toothless planetary gear mechanism may include a counterbalance member which is configured to counterbalance an imbalance of weight caused by the offsetting of the toothless planet gear with respect to the axis of rotation of the motor shaft.

Preferably, the toothless planetary gear mechanism does not include a weighted counterbalance member, but comprises first and second identical toothless planet gears arranged half a revolution out of phase with each other such that said first and second toothless planet gears counterbalance each other on rotation.

Preferably, the first and second toothless planet gears are located for rotation half a revolution out of phase with each other within a common, single toothless internal ring gear.

Each of the first and second toothless planet gears may be supportably mounted on respective first and second eccentric wheels.

The toothless planet gear may be rotatably supported on the eccentric wheel with its axis of rotation offset by a predetermined amount with respect to the axis of rotation of the motor shaft and located within the toothless internal ring gear to engage a toothless inner ring gear surface by heating the toothless internal ring gear and shrink fitting it over the toothless planet gear.

Preferably, the first and second toothless planet gears are rotatably supported respectively on the first and second eccentric wheels with their axes of rotation offset by a predetermined amount with respect to the axis of rotation of the motor shaft and located within a common, single toothless internal ring gear for rotation half a revolution out of phase with each other to engage a toothless inner ring gear surface by heating the toothless internal ring gear and shrink fitting it over the first and second toothless planet gears.

Preferably, a one way drive means is provided between the motor shaft and the sprocket such that when the sprocket is being driven by a manually provided driving force through pedals of the pedal driven apparatus, the motor shaft is not caused to rotate.

In a third main aspect of the invention, there is provided a sprocket assembly for a pedal driven apparatus, comprising: a sprocket; first means for mechanically coupling the sprocket to a pedal driven pedal spindle; and second means for mechanically coupling the sprocket to an output shaft of a motor, wherein the first mechanical coupling means includes a first one way drive means coupling the pedal spindle and the sprocket such that the first one way drive means transfers a manually provided driving force applied to the pedals of the pedal driven apparatus to the sprocket to cause rotation of the sprocket and allows the pedal spindle to freewheel when the sprocket is being driven by the motor output shaft.

Preferably, the second mechanical coupling means is configured to mechanically couple the sprocket to the output shaft of the motor where the motor is arranged concentrically around the pedal spindle of the pedal driven apparatus such that the pedal spindle is freely accommodated through a hollow bore of the motor shaft and such that their axes of rotation are parallel.

Preferable, the second mechanical coupling means comprises a gear mechanism mechanically coupling the motor output shaft to the sprocket, wherein the gear mechanism has a reduction gear ratio and operates to transfer a motor provided driving force from the motor output shaft to the sprocket at said reduction gear ratio. The gear mechanism preferably comprises a planetary gear mechanism having a planet gear whose axis of rotation is offset by a predetermined amount with respect to the axis of rotation of the motor output shaft.

Preferably, the planet gear is rotatably supported on an eccentric wheel whereby the planet gear is made to rotate as the eccentric wheel rotates and whereby the position of the axis of rotation of the planet gear changes relative to the axis of rotation of the motor output shaft as the planet gear rotates such that the varying position of the axis of rotation of the planet gear defines a circle centred on the axis of rotation of the motor output shaft, said circle having a radius equal to the predetermined offset amount.

A planet gear carrier of the planetary gear mechanism may be configured to transfer the motor provided driving force to the sprocket. The planet gear carrier may be affixed to the sprocket for rotation therewith. The planet gear carrier may also be affixed to an output member of the first one way drive means for rotation therewith, whereby the manually provided driving force applied to the pedals is transferred to the motor output shaft through the planetary gear mechanism as well as to the sprocket.

Preferably, the second mechanical coupling means includes a second one way drive means coupling the motor output shaft and the sprocket such that when the sprocket is being driven by a manually provided driving force applied to the pedals of the pedal driven apparatus, the motor shaft is not caused to rotate. The second one way drive means may comprise at least one ratchet member moveably disposed on the planet gear carrier and arranged to engage a rack of a ratchet wheel fixed to rotate with the sprocket.

BRIEF DESCRIPTION OF THE DRAWINGS

The foregoing and further features of the present invention will be apparent from the following description of preferred embodiments which are provided by way of example only in connection with the accompanying figures, of which:

FIG. 10 is a schematic view of a pedal driven apparatus having a motor and sprocket assembly according to any of the embodiments of the invention.

DESCRIPTION OF PREFERRED EMBODIMENTS

Figure 1:
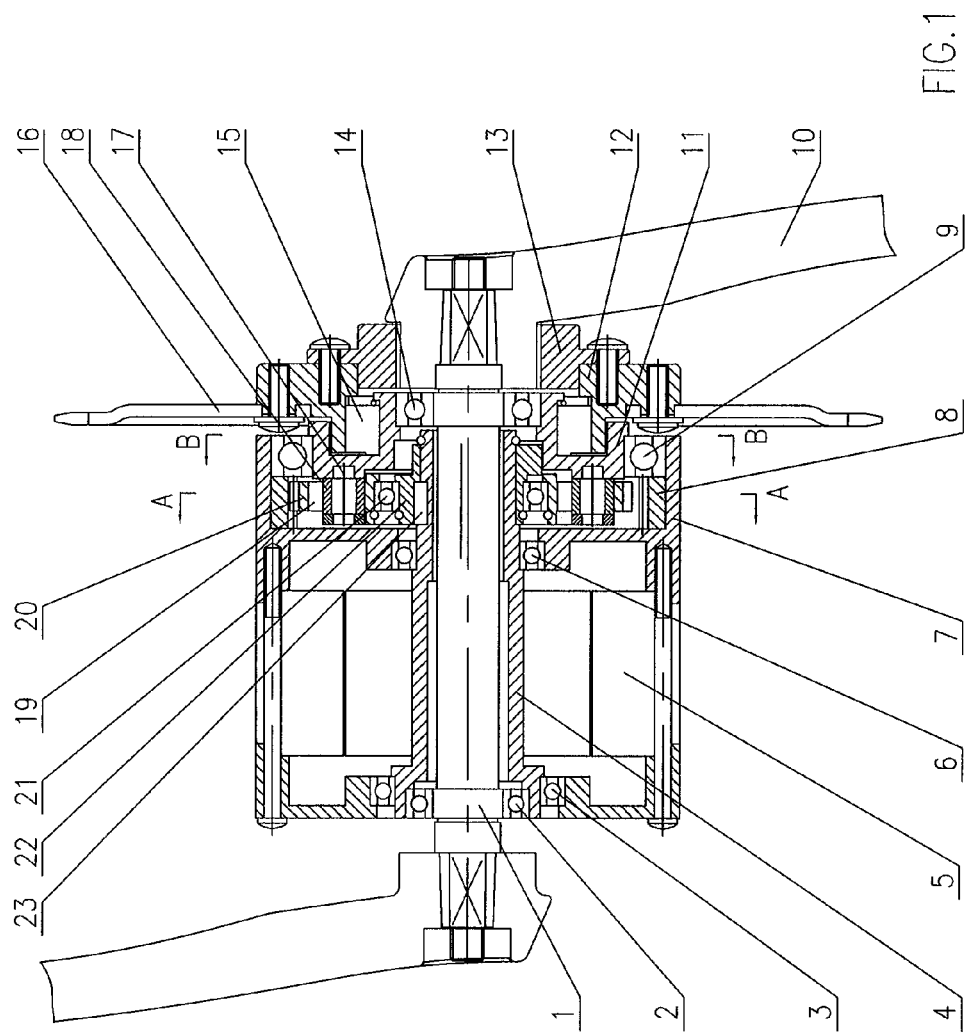
FIG. 1 is a structural schematic view of a first embodiment of a motor and sprocket assembly for a pedal driven apparatus according to the invention.
Figure 2:
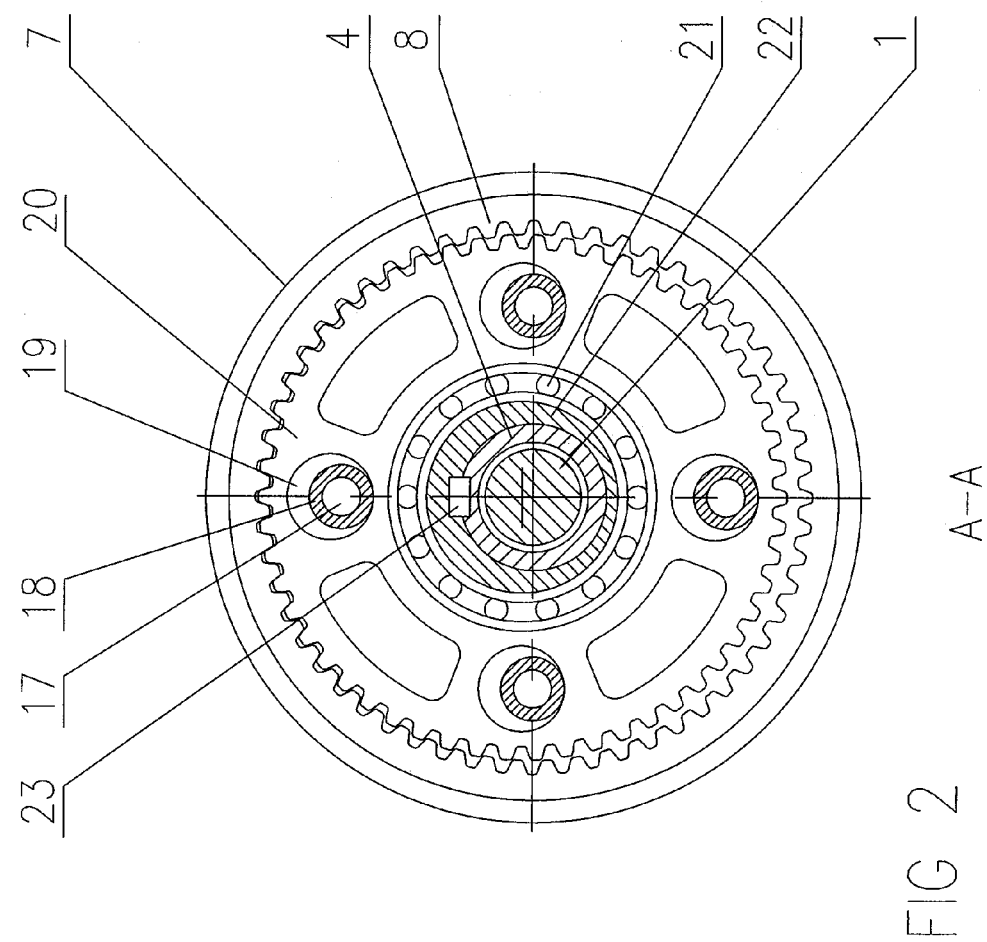
FIG. 2 is a sectional view taken along the line A-A of FIG. 1.
Figure 3:
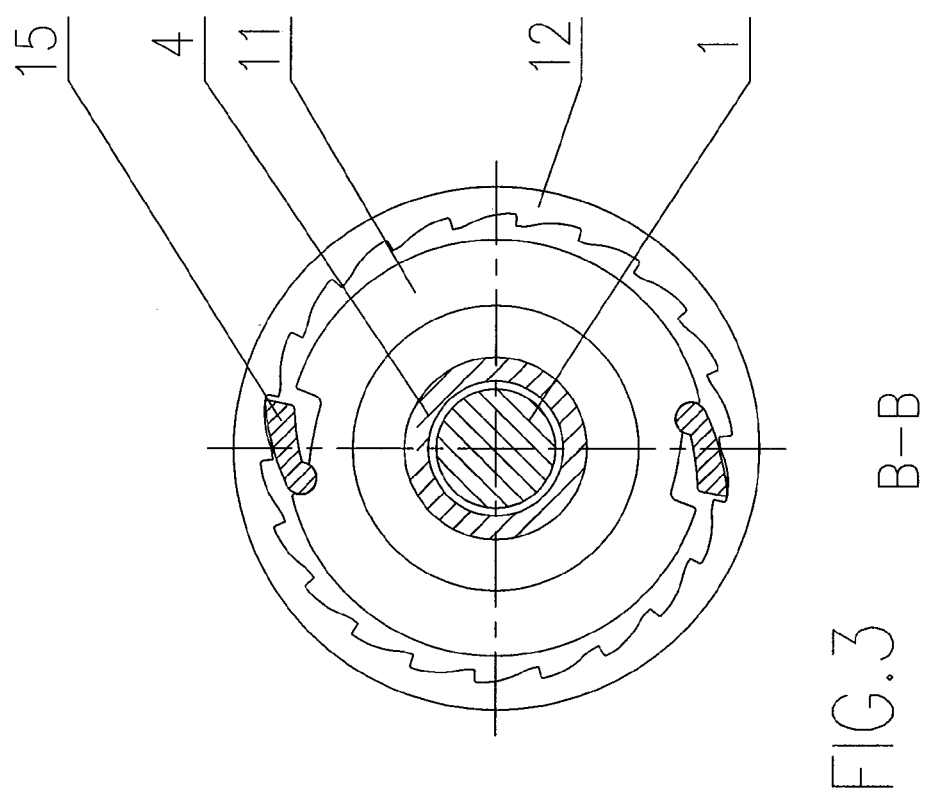
FIG. 3 is an enlarged sectional view taken along the line B-B of FIG. 1.
Figure 4:
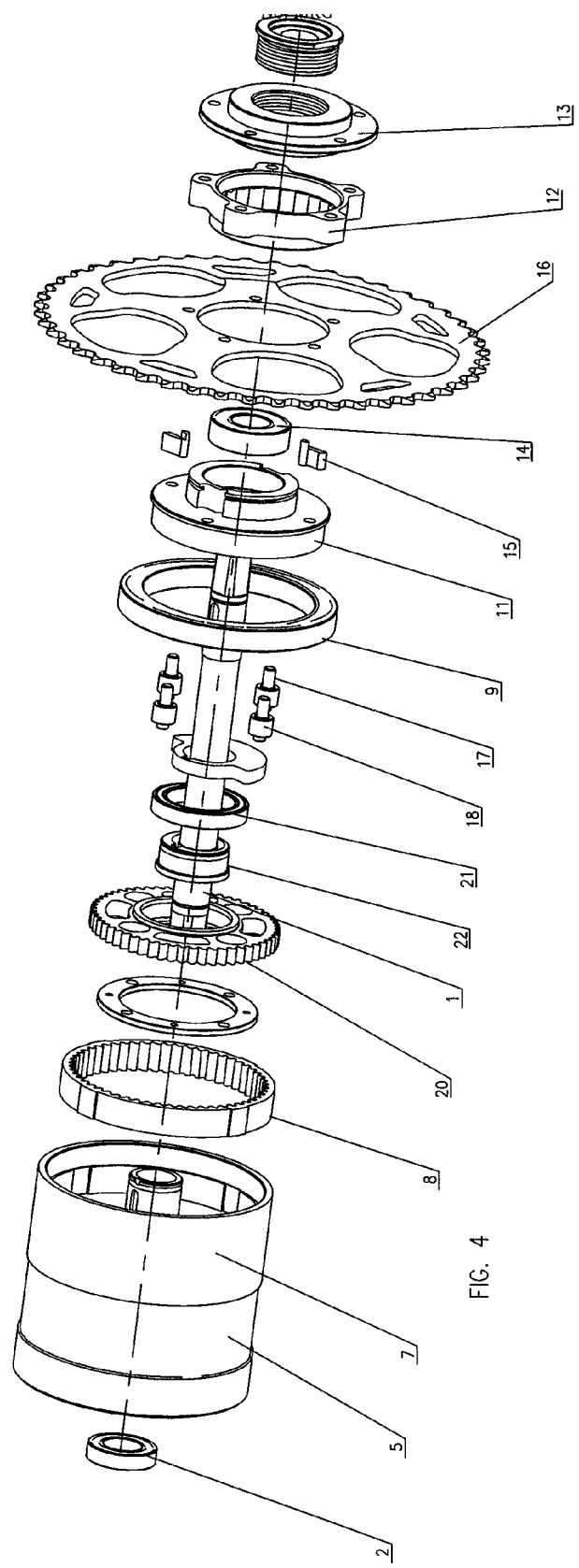
FIG. 4 is an exploded perspective view of the embodiment of FIG. 1.

The invention primarily concerns motorized bicycles, although the invention is applicable to any hybrid apparatus having pedals to provide a human power input and a motor to provide a mechanical power input. A motorized bicycle is a bicycle with an attached motor used to power the vehicle, or to assist with pedaling. Sometimes classified as a motor vehicle, or a class of hybrid vehicle, motorized bicycles may be powered by different types of engines. Motorized bicycles are distinguished from motorcycles by being capable of being powered by pedals alone if required. The actual usage of the pedals varies widely according to the type of vehicle. Some can be propelled by the motor alone if the rider chooses not to pedal. Those known as power-assist bikes have the pedals as the main form of propulsion with the motor used to give a bit of extra power, especially uphill. Many motorized bicycles are based on standard bicycle frame designs and technologies.

In a parallel hybrid motorized bicycle, human and motor inputs are mechanically coupled either in the bottom bracket, the rear or the front wheel, whereas in a (mechanical) series hybrid cycle, the human and motor inputs are coupled through differential gearing. In a (electronic) series hybrid cycle, human power is converted into electricity and is fed directly into the motor and mostly additional electricity is supplied from a battery.

"Pedelec" is a European term that generally refers to an electric bicycle that incorporates a torque and/or a speed sensor and/or a power controller that delivers a proportionate level of assist and only runs when the rider pedals.

The present invention is applicable to all of the above forms of bicycle having both a motor unit and pedals, but where the motor is arranged in close proximity to the sprocket assembly, preferably with the motor being arranged concentrically with the pedal spindle such that the pedal spindle is accommodated within a hollow shaft of the motor.

It is to be understood in the following description that the terms "sprocket" or "drive sprocket" are to be taken to mean any rotational component capable of transferring a driving force to another rotational component and includes, but is not limited to, toothed sprockets for engaging drive chains, belt pulleys for engaging drive belts, or gear wheels for engaging other gear wheels or gear trains.

In the following description, reference will be made to a bicycle as an example of a pedal driven apparatus, but it will be understood that the invention is not limited to bicycles and the following description is equally applicable to other types of pedal driven apparatuses such as tricycles, pedalos (pedal boat), or the like.

Referring to FIGS. 1 to 4, shown is a first embodiment of a motor and sprocket assembly according to the invention. A bicycle having said motor and sprocket assembly comprises manually operable pedals 10 fixed for rotation with a pedal spindle 1 for receiving a manually provided driving force and a motor 5 having a shaft 4 for receiving a motor provided driving force. A first torque transmission path is provided for transferring the manually provided driving force to a sprocket 16 of the pedal driven apparatus and a second torque transmission path is provided for transferring the motor provided driving force to said sprocket 16 of the pedal driven apparatus. A first one way drive means 13 is provided in the first torque transmission path between the pedal spindle 1 and the sprocket 16 such that, when the sprocket is being driven by the motor provided driving force through the second torque transmission path, the pedal spindle 1 is able to freewheel.

An advantage of this arrangement is that it is not necessary to provide a freewheel sprocket on the rear wheel of the bicycle. This is because the first one way drive means 13 provides this function in addition to enabling the pedal spindle 1 to freewheel when the motor drive is operating.

The first torque transmission path comprises the manually operable pedals 10, the pedal spindle 1 to which the pedals 10 are affixed for rotation therewith, and the first one way drive means 13. The first one way drive means 13 mechanically couples the pedal spindle 1 to the sprocket 16 such that the first one way drive means 13 transfers the manually provided driving force applied to the pedals 10 to the sprocket 16 to cause rotation of the sprocket. The first one way drive means 13 also allows the pedal spindle 1 to freewheel when the sprocket 16 is being driven by the motor shaft 4. The first one way drive means 13 may comprise a freewheel device such as an over-running bearing or an over-running clutch or any device suitable for enabling drive to be applied through an output member of the one way drive means, but for an input member to freewheel when no drive is being transferred through said first one way drive means 13.

The second torque transmission path comprises the motor shaft 4 and a gear mechanism housed in a casing 7 mechanically coupling the motor shaft 4 to the sprocket 16. The gear mechanism has a reduction gear ratio and operates to transfer the motor provided driving force from the motor shaft 4 to the sprocket 16 at said reduction gear ratio. The gear mechanism may comprise a planetary gear mechanism having a planet gear 20 whose axis of rotation is offset by a predetermined amount with respect to the axis of rotation of the motor shaft 4.

This allows a high speed motor to be employed whereby the gear mechanism applies a suitable reduction gear ratio to the output shaft of the motor to rotate the sprocket at high torque and low speed (relatively speaking when compared to the motor shaft speed of rotation).

As shown more explicitly in FIGS. 1 to 4, the motor and sprocket assembly comprises: the motor 5, the motor rotor hollow shaft 4 supported by bearings 3 and 6, an end cover at one end of the motor 5, i.e. the casing 7 of the planetary gear mechanism, an internal gear ring 8 fixed within the casing 7 of the planetary gear mechanism; an eccentric wheel 22 fixed around the hollow shaft 4 of the motor 5, and a flat key 23 disposed between the hollow shaft 4 and the eccentric wheel 22 for transmitting torque. The planet gear 20 is fit around the outer circumference of the eccentric wheel 22 by means of a bearing 21, for rotation with the eccentric wheel 22, and engaged with the teeth of the internal gear ring 8. Four circular holes 19 are provided on a side surface of the planet gear 20. A planet gear carrier 11 is supported within the casing 7 by means of a bearing 9, and is provided with four pins 17 on a side surface facing the planet gear 20. Bushings 18 are provided around the pins 17 and inserted into the four circular holes 19 on the side surface of the planet gear 20. The function of the four pins 17 and the bushings 18 inserted into the four circular holes 19 on the planet gear 11 is to transfer drive from the planet gear 20 to the planet gear carrier 11 as the planet gear 20 rotates. The bushings 18 revolve around the pins 17 to accommodate rotation of the planet gear 20. The holes have a diameter larger than the diameter of the pins 17 to accommodate eccentric movement of the planet gear 20 with respect to the axis of rotation of the motor shaft 4.

To effect the transfer of a motor driving force from the planet gear 20 to the planet gear carrier 11, ratchet seats are arranged on an outer side of the planet gear carrier 11 and ratchets 15 moveably disposed on the ratchet seats and engaged with an inner surface of a ratchet wheel 12 which is affixed to the sprocket 16. The pedal central spindle 1 is freely disposed in the hollow shaft 4 of the motor 5 and is mounted coaxially with the motor shaft 4. The pedal central spindle 1 is supported in the hollow shaft 4 of the motor and the planet gear carrier 11 by means of bearings 2 and 14 respectively. The pedal cranks 10 are disposed at the ends of the pedal central spindle 1. Associated with the pedal crank 10 on a sprocket side of the assembly is the first one way drive means comprising a one-way freewheel 13 fixed on said pedal crank 10. A side surface of the ratchet wheel 12 is fixed on a flange of the one-way freewheel 13, and the sprocket 16 is fixed on the other side surface of the ratchet wheel 12.

In operation of this embodiment, during pedal driving, the pedal crank 10 drives the ratchet wheel 12 to rotate through the one-way freewheel 13, so that the sprocket 16 fixed on the ratchet wheel 12 rotates simultaneously, and propels the bicycle to move forward through a chain drive (not shown) of the sprocket 16.

A second one way drive means comprising the ratchet members 15 and the ratchet wheel 12 is provided in the second torque transmission path between the motor shaft 4 and the sprocket 16 such that, when the sprocket 16 is being driven by the manually provided driving force through the first torque transmission path, the motor shaft 4 is not caused to rotate. The ratchet members 15 moveably disposed on the planet gear carrier 11 engage a rack of the ratchet wheel 12. The ratchet members 15 may have associated therewith means (not shown) for resiliently biasing free ends of said ratchet members 15 outwardly from a surface of the planet gear carrier 11 such that said free ends of the ratchet members 15 engage teeth in the rack of the ratchet wheel 12.

Because of the one-way transmitting function of the second one-way drive means 12, 15, the rotation of the ratchet wheel 12 by the pedal 10 will not drive the planet gear carrier 11 or the motor shaft 4 to rotate. During motor driving, the hollow shaft 4 of the motor rotates the eccentric wheel 22 of the planetary gear mechanism, and then the eccentric wheel 22 drives the planet gear 20 to revolve around the motor axis. According to the angular position of the eccentric 22 at any time during rotation, the teeth of the planet gear 20 engage with the corresponding teeth of the internal gear ring 18, so as to make the planet gear 20 rotate in relation to the motor axis and this rotation will be outputted by the planet gear carrier 11. The planet gear carrier 11 rotates the ratchet wheel 12 by means of the ratchets 15 disposed on the ratchet seats, and then the ratchet wheel 12 rotates the sprocket 16 which is fixed together with the ratchet wheel 12, so as to propel the bicycle to move forward by the chain. At this time, because of the one-way transmitting function of the first one-way transmitting means, (i.e. the one-way freewheel 13), the rotation of the sprocket 16 will not make the pedal crank 10 or the pedal spindle 1 rotate.

In this embodiment, the motor 5 is arranged concentrically around the pedal spindle 1 such that the pedal spindle 1 is freely accommodated through the hollow bore of the motor shaft 4 and such that their axes of rotation are parallel and preferably coaxial, i.e. the pedal spindle 1 and the motor shaft 4 share the same axis of rotation.

This arrangement results in a neat and compact integration of the motor with the pedal spindle and sprocket assembly.

Also in this embodiment, the planet gear 20 is rotatably supported on the eccentric wheel 22 whereby the planet gear 20 is made to rotate as the eccentric wheel 22 rotates and whereby the position of the axis of rotation of the planet gear 20 changes relative to the axis of rotation of the motor shaft 4 as the planet gear 20 rotates such that the varying position of the axis of rotation of the planet gear 20 defines a circle centred on the axis of rotation of the motor shaft 1, said circle having a radius equal to the predetermined offset amount. The planet gear 20 has a smaller diameter than the internal ring gear 8, the internal ring gear 8 having a central axis co-incident with the axis of rotation of the motor shaft 4. The planet gear 20 has a smaller number of teeth than the internal ring gear 8.

The planet gear 20 rotates around the inner toothed surface of the inner ring gear 8 such that the outer toothed surface of the planet gear 20 meshes with only a small number of teeth of the inner ring gear 8 at any point of time.

The planet gear carrier 11 of the planetary gear mechanism transfers the motor provided driving force to the sprocket 16 and, in doing so, provides a neat and efficient way of mechanically transferring the motor driving force to the sprocket 16.

The planetary gear mechanism includes a counterbalance member 24 which is configured to counterbalance an imbalance of weight caused by the offsetting of the planet gear 20 with respect to the axis of rotation of the motor shaft 4. The counterbalance member 24 comprises a generally semi-circular weighted member which is arranged to rotate with the planet gear 20 so as to counterbalance the planet gear when the planet gear is rotating.

The motor 5 comprises an electric motor powered by a battery pack carried on the pedal driven apparatus.

Figure 5:
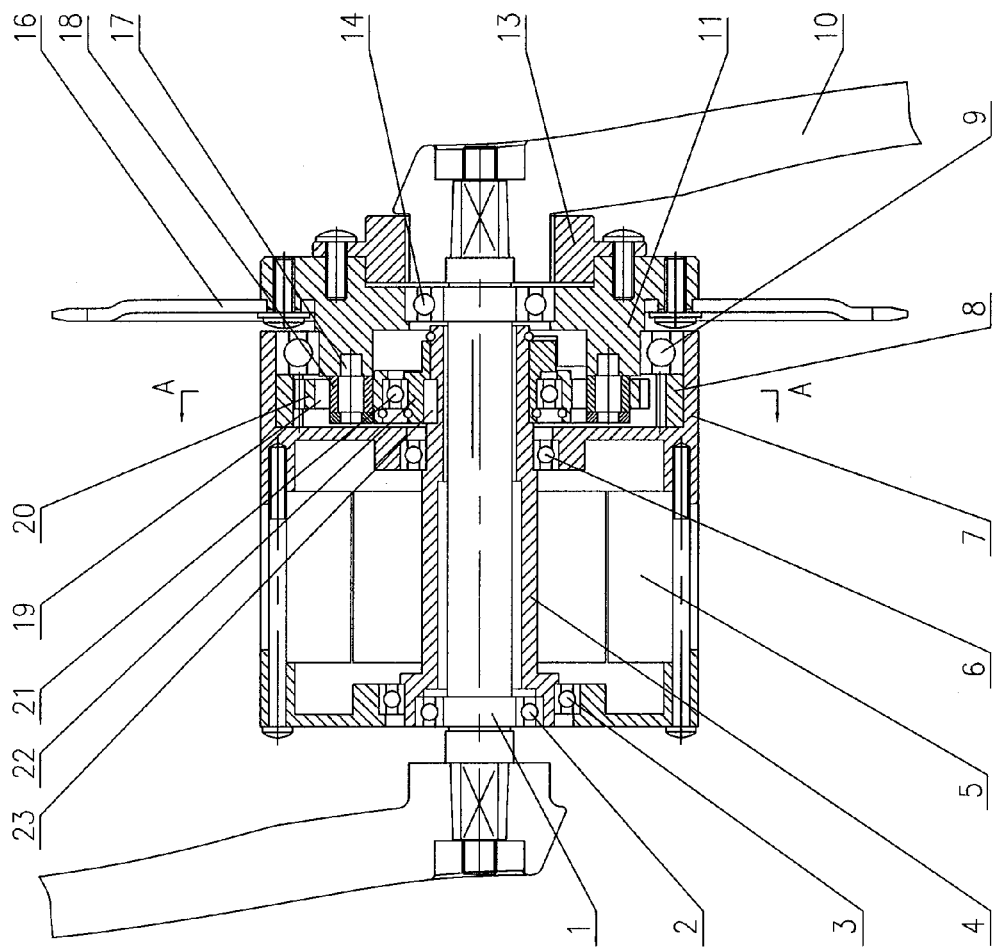
FIG. 5 is a structural schematic view of a second embodiment of a motor and sprocket assembly for a pedal driven apparatus according to the invention.

FIG. 5 depicts a second embodiment of the motor and sprocket assembly according to the invention. In the description of this embodiment, like numerals to those used in FIGS. 1 to 4 are used to denote like parts, although any differences in the parts are described in the following.

In this embodiment, the second one-way drive or transmitting means, (i.e. the ratchet wheel 12 and ratchets 15), is omitted, so that the planet gear carrier 11' of the planetary gear mechanism is fixedly coupled to the sprocket 16 for rotation therewith. The planet gear 20 and the sprocket 16 are directly and fixedly connected with the (output member of) one-way freewheel 13 of the first one-way drive/transmitting means. As such, the planet gear carrier 11' is modified compared to its configuration in the first embodiment of FIGS. 1 to 4 to enable it to be directly and fixedly connected with the one-way freewheel 13. In this embodiment, the direct coupling of the planet gear carrier 11' to the freewheel 13 enables the bicycle function to be altered. In this embodiment, the motor 5 can function as a power generating device driven by pedaling or forward motion of the bicycle, i.e. the bicycle freewheeling down a slope, for example.

In operation of this embodiment, during pedal driving, the pedal crank 10 drives the planet gear carrier 11' and the sprocket 16 to rotate simultaneously through the one-way freewheel 13, and then propels the bicycle to move forward through the chain. At this time, since the planet gear carrier 11' rotates along with the sprocket 16, it drives the planet gear 20 and the eccentric wheel 22 to rotate, which in turn drives the hollow shaft 4 of the motor 5 to rotate. Under this circumstance, if the rider intends to increase the load applied on the pedals to do exercise using the bicycle, or intends to use the motor to function as a brake for decelerating the bicycle when going downhill or to use the motor to generate power for lights or recharging the motor battery pack, the rider can control a switch installed on, for example, a handlebar of the bicycle to switch the circuit of a controller so as to transform the motor 5 to a power generating device, the power generated by which can be utilized by a load or for charging a battery. During normal riding, the controller can be switched to be in a normal riding state, so that no additional load is applied on pedals. During motor driving, the hollow shaft 4 of the motor 5 drives the eccentric wheel 22 of the planetary gear mechanism to rotate, which in turn drives the planet gear 20 to revolve around the axis of the motor. Consequently, torque will be outputted by the planet gear carrier 11' which drives the sprocket 16 to rotate, and then propels the bicycle to move forward through the chain drive. At this time, due to the one-way transmitting function of the one-way freewheel 13, the rotation of the sprocket will not drive the pedal crank 10 to rotate, i.e. the pedal crank and the pedal spindle can freewheel.

In this example, when moving forward, the bicycle can drive the motor to generate power through the transference of power transferring from the chain drive, whilst no one-way freewheel having the one-way drive/transmitting function is provided at the rear wheel hub.

Figure 6:
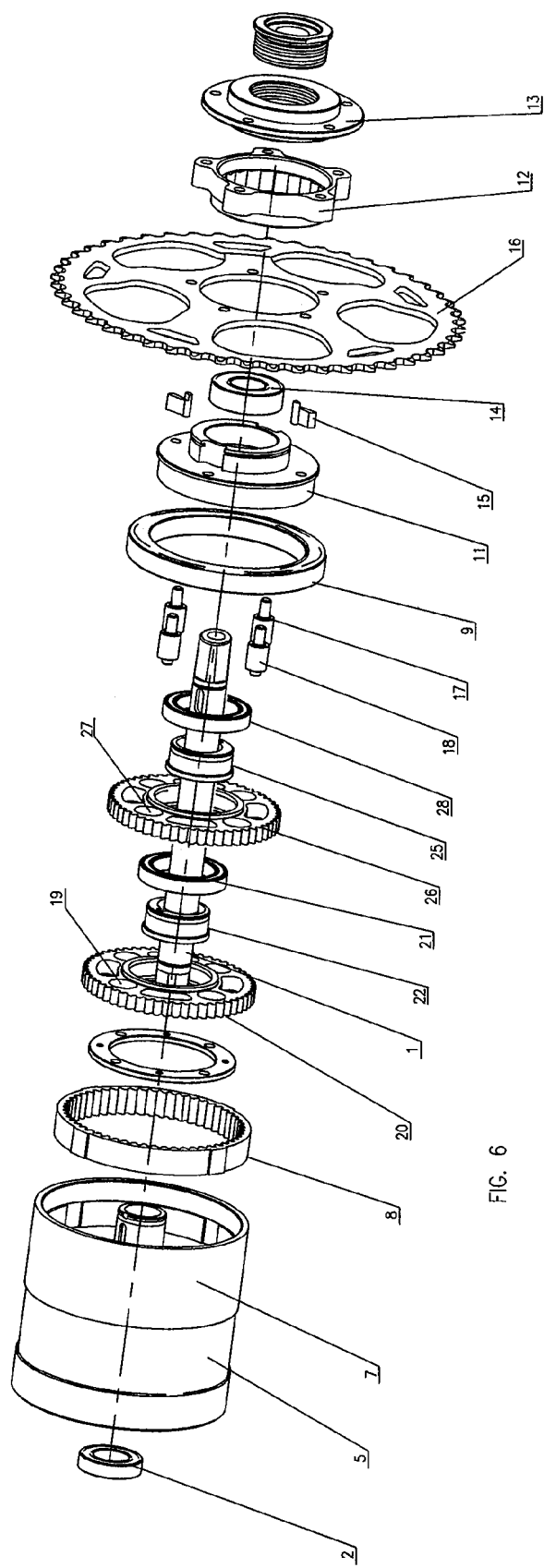
FIG. 6 is an exploded perspective view of a third embodiment of a motor and sprocket assembly for a pedal driven apparatus according to the invention.

FIG. 6 depicts a third embodiment of the motor and sprocket assembly according to the invention. In the description of this embodiment, like numerals to those used in FIGS.

1 to 5 are used to denote like parts, although any differences in the parts are described in the following.

In this embodiment, the planetary gear mechanism does not include a weighted counterbalance member, but comprises first and second identical planet gears 20, 26 arranged half a revolution out of phase with each other such that said first and second planet gears 20, 26 counterbalance each other on rotation. The first and second planet gears 20, 26 may be located within respective internal ring gears, but are preferably located for rotation half a revolution out of phase with each other within a common, single internal ring gear 8' of double width compared to the internal ring gear of the first or second embodiments. The first and second planet gears 20, 26 are supportably mounted on respective first and second eccentric wheels 22, 25. The second planet gear 26 is mounted on the second eccentric wheel 25 by a bearing 28. The pins 17 are made longer than in other embodiments and extend through respective sets of apertures 19, 27 in both of the planet gears 20, 26.

The use of two out of phase planet gears 20, 26 negates the need to provide a weighted counterbalance member and provides a balanced system which transfers motor driving force to the sprocket 16 more efficiently and quietly than the foregoing arrangement including a weighted counterbalance.

This embodiment in like manner to the second embodiment depicted by FIG. 5 includes a second one way drive means 12, 15. However, it will be understood that the described arrangement of first and second planet gears 20, 26 of this embodiment (FIG. 6) can be employed within either of the first (FIGS. 1 to 4) or second (FIG. 5) embodiments with minimal modification. Furthermore, the operation of this embodiment is otherwise the same in all respects to the second embodiment save for the fact that counterbalancing of the (first) planet gear 20 is provided by the second planet gear 26.

In the foregoing embodiments of the invention, the teeth on the gears of the planetary gear mechanism are depicted as comprising spur or straight cut gears in which the edge of each tooth is straight and aligned parallel to the axis of rotation of the gear. However, in preferred embodiments, the gears comprise helical gears.

Helical gears offer a refinement over spur gears. The leading edges of the teeth are not parallel to the axis of rotation, but are set at an angle to said axis of rotation of the gear. Since the gear is curved, this angling causes the tooth shape to be a segment of a helix. The angled teeth engage more gradually than do spur gear teeth causing them to run more smoothly and quietly. With parallel helical gears, each pair of teeth first make contact at a single point at one side of the gear wheel; a moving curve of contact then grows gradually across the tooth face to a maximum then recedes until the teeth break contact at a single point on the opposite side. In spur gears teeth suddenly meet at a line contact across their entire width causing stress and noise. Spur gears make a characteristic whine at high speeds and can not take as much torque as helical gears. A disadvantage of helical gears is a resultant thrust along the axis of the gear, which normally needs to be accommodated by appropriate thrust bearings, but in the present invention, other components of the motor transmission system act to oppose any thrust along the axis of the gear caused by meshing helical gears and so thrust bearings may not be necessary in some embodiments. In all other respects, the planetary gear mechanism having helical gears is the same as the embodiments of the planetary gear mechanism hereinbefore described.

Figure 7:
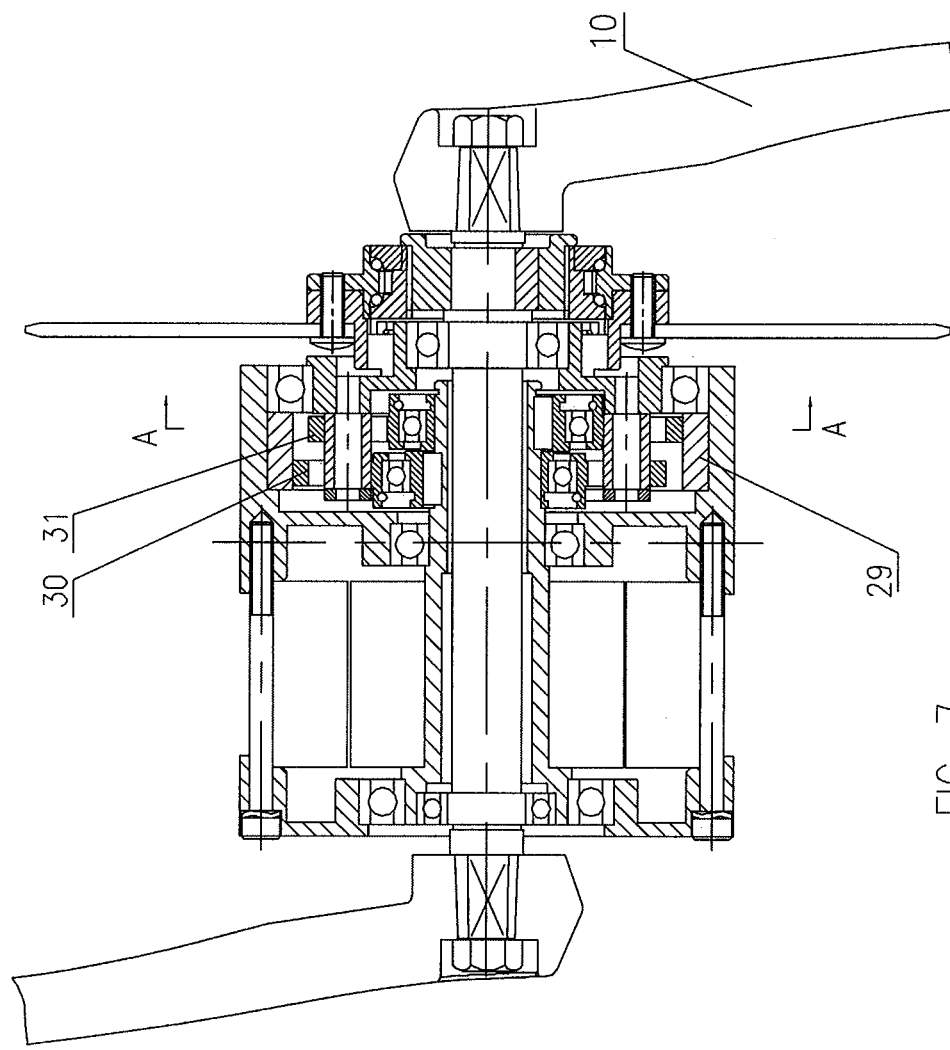
FIG. 7 is a structural schematic view of a fourth embodiment of a motor and sprocket assembly for a pedal driven apparatus according to the invention.
Figure 8:
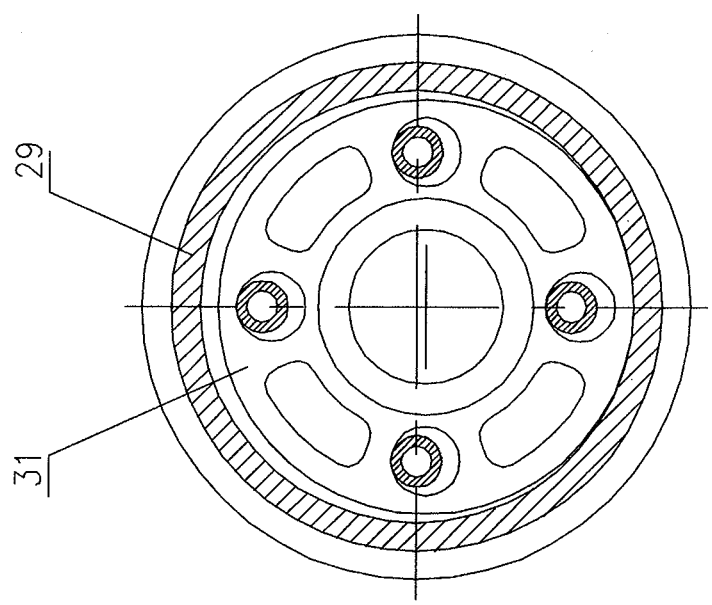
FIG. 8 is a sectional view taken along the line A-A of FIG. 7.
Figure 9:
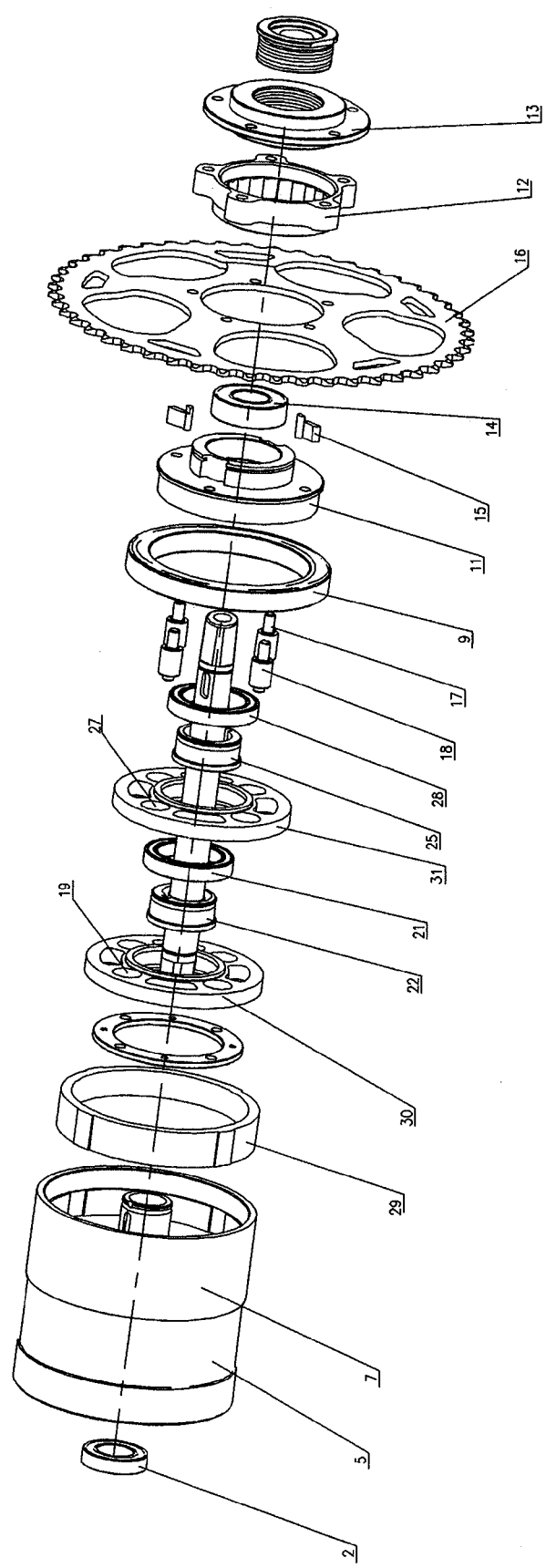
FIG. 9 is an exploded perspective view of the embodiment of FIG. 7.

FIGS. 7 to 9 depict a fourth embodiment of the motor and sprocket assembly according to the invention. In the description of this embodiment, like numerals to those used in FIGS. 1 to 6 are used to denote like parts, although any differences in the parts are described in the following.

In this embodiment, the arrangement of components is generally identical to that of the third embodiment save for the gear mechanism comprising a toothless planetary gear mechanism.

The toothless planetary gear mechanism has first and second toothless planet gears 30, 31 whose axes of rotation are offset by a predetermined amount with respect to the axis of rotation of the motor shaft 4. The reduction gear ratio of the toothless planetary gear mechanism is defined by a relationship between the respective diameters of the toothless planet gears 30, 31 and a single, common toothless internal ring gear 29 within which the first and second planet gears 30, 31 are located for rotation. The toothless planet gears 30, 31 have smaller diameters than the toothless internal ring gear 29. The first and second toothless planet gears 30, 31 are rotatably supported respectively on first and second eccentric wheels 22, 25 and located within the common, single toothless internal ring gear 29 half a revolution out of phase with each other to each counterbalance the other. The second planet gear 31 is mounted on the second eccentric wheel 25 by a bearing 28. The pins 17 are made longer than in other embodiments and extend through respective sets of apertures 19, 27 in both of the planet gears 30, 31. Outer surfaces of the first and second planet gears 30, 31 engage an inner surface of the toothless inner ring gear 29. The inner surface of the internal ring gear and/or the outer surfaces of the planet gears 30, 31 may be roughened to enhance the coefficient of friction acting between said engaged surfaces at their lines of contact. The friction fit between the first and second planet gears 30, 31 and the toothless internal ring gear 29 is achieved by heating the toothless internal ring gear 29 and shrink fitting it over the first and second toothless planet gears 30, 31.

One advantage of a toothless planetary gear mechanism is quietness. The lack of gear teeth and the reliance on contact between generally smooth, although possibly roughened, surfaces to effect a transfer of power from the motor to the sprocket results in very quiet operation and more efficient power transfer as there is no slippage or chatter between gear teeth as can occur in toothed gear mechanisms.

It will be understood that this embodiment could be modified to provide only a single toothless planet gear in a similar manner to the first embodiment depicted by FIGS. 1 to 4. In such a case, the toothless planetary gear mechanism would include a counterbalance member configured to counterbalance an imbalance of weight caused by the offsetting of the toothless planet gear with respect to the axis of rotation of the motor shaft.

It will also be appreciated that, whilst this embodiment includes a second one way drive means 12, 15 in a similar manner to the first and third embodiments, it could be modified in a similar manner to the second embodiment to omit the second one way drive means and directly and fixedly couple the planet gear carrier 11 to the first one way drive means 13. In such case, the planet gear carrier 11 may be affixed to an output member of the first one way drive means 13 for rotation therewith, whereby the manually provided driving force applied to the pedals 10 is transferred via the first torque transmission path to the motor shaft 4 through the toothless planetary gear mechanism as well as to the sprocket 16.

FIG. 10 depicts a bicycle 40 having a motor and sprocket assembly 50 according to any of the foregoing embodiments. The bicycle body may be provided with a recess at the position of the central spindle for receiving the motor and the gear mechanism. The assembly of the motor and the gear mechanism, together with the central pedal spindle, are received tightly in the recess.

It can be seen therefore that the invention provides a pedal driven apparatus comprising: manually operable pedals fixed for rotation with a pedal spindle for receiving a manually provided driving force; a motor having a shaft for receiving a motor provided driving force; a first torque transmission path for transferring the manually provided driving force to a sprocket of the pedal driven apparatus; a second torque transmission path for transferring the motor provided driving force to said sprocket of the pedal driven apparatus; wherein a first one way drive means is provided in the first torque transmission path between the pedal spindle and the sprocket such that when the sprocket is being driven by the motor provided driving force through the second torque transmission path, the pedal spindle is able to freewheel.

It can also be seen that the invention provides a motor for a pedal driven apparatus comprising: a shaft for receiving a motor provided driving force; and a gear mechanism mechanically coupling the motor shaft to a sprocket of the pedal driven apparatus, wherein the gear mechanism has a reduction gear ratio and operates to transfer the motor provided driving force from the motor shaft to the sprocket at said reduction gear ratio and wherein the motor is arranged concentrically around a pedal spindle of the pedal driven apparatus such that the pedal spindle is freely accommodated through a hollow bore of the motor shaft and such that their axes of rotation are parallel.

And it can be seen that the invention provides a sprocket assembly for a pedal driven apparatus, comprising: a sprocket; first means for mechanically coupling the sprocket to a pedal driven pedal spindle; and second means for mechanically coupling the sprocket to an output shaft of a motor, wherein the first mechanical coupling means includes a first one way drive means coupling the pedal spindle and the sprocket such that the first one way drive means transfers a manually provided driving force applied to the pedals of the pedal driven apparatus to the sprocket to cause rotation of the sprocket and allows the pedal spindle to freewheel when the sprocket is being driven by the motor output shaft.

As compared with known motor assisted bicycles, the invention has at least the following advantages:

1) The present invention uses a specially designed motor having a hollow shaft which is directly connected with a reduction planetary gear mechanism and which, due to the fact that the planet gear has fewer teeth or a smaller diameter than the ring gear, a sufficient transmission ratio can be obtained with the smallest space size. Therefore all of the parts together with the pedal central spindle can be constituted as a coaxial driving assembly, so that the structure is compact, the bicycle is light in weight, and its operation is more flexible;

(2) The present invention can be used in combination with a standard external transmission or internal transmission installed on the rear wheel of a bicycle, for either pedal driving or motor driving. The speed ratio can be varied during the riding of the bicycle so that the bicycle can be operated at the best driving efficiency with various ranges of speed on either hills or flats;

(3) The present invention is very practical, and can be directly installed on an existing bicycle after having the central spindle thereof modified slightly;

(4) With driving modes based on the above structure, it can reduce a rider's effort during riding;

(5) The present invention can be partially modified so as to become an exercise bicycle having a power generation function and other functions such as the battery can be charged by the inertial moment of the bicycle when going downhill or by the user pedaling; and (6) The present invention is novel in structure, simple in profile, and can be applied to various types of electric bicycles or electric assisted bicycles.

In general, the invention provides a hybrid bicycle which can be manually propelled, but which includes a motor unit for also causing forward propulsion of the bicycle. The bicycle comprises manually operable pedals fixed for rotation with a pedal spindle for receiving a manually provided driving force and a motor having a shaft for receiving a motor provided driving force. A first torque transmission path is provided for transferring the manually provided driving force to a sprocket of the pedal driven apparatus and a second torque transmission path is provided for transferring the motor provided driving force to said sprocket of the pedal driven apparatus. A first one way drive means is also provided. This is provided in the first torque transmission path between the pedal spindle and the sprocket such that when the sprocket is being driven by the motor provided driving force through the second torque transmission path, the pedal spindle is able to freewheel. The second torque transmission path may include a gear mechanism mechanically coupling the motor shaft to the sprocket of the pedal driven apparatus. The gear mechanism has a reduction gear ratio and operates to transfer the motor provided driving force from the motor shaft to the sprocket at said reduction gear ratio. The motor may be arranged concentrically around a pedal spindle of the pedal driven apparatus such that the pedal spindle is freely accommodated through a hollow bore of the motor shaft and such that their axes of rotation are parallel and preferably coincident.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A pedal driven apparatus comprising:
manually operable pedals fixed for rotation with a pedal spindle for receiving a manually provided driving force;

a motor having a motor shaft for receiving a motor provided driving force; wherein the motor is arranged concentrically around the pedal spindle such that the pedal spindle is freely accommodated through a hollow bore of the motor shaft, the motor shaft supported by a bearing on a casing of the pedal driven apparatus; the pedal spindle and the motor shaft sharing the same axis of rotation;

a first torque transmission path for transferring the manually provided driving force to a sprocket of the pedal driven apparatus;

a second torque transmission path for transferring the motor provided driving force to said sprocket of the pedal driven apparatus;

wherein a first one way drive means is provided in the first torque transmission path between the pedal spindle and the sprocket such that when the sprocket is being driven by the motor provided driving force through the second torque transmission path, the pedal spindle is able to freewheel;

wherein the second torque transmission path comprises the motor shaft and a gear mechanism mechanically coupling the motor shaft to the sprocket, wherein the gear mechanism has a reduction gear ratio and operates to transfer the motor provided driving force from the motor shaft to the sprocket at said reduction gear ratio; the gear mechanism comprises a planetary gear mechanism having a planet gear whose axis of rotation is offset by a predetermined amount with respect to the axis of rotation of the motor shaft; the planet gear being rotatably supported on an eccentric wheel whereby the planet gear is made to rotate as the eccentric wheel rotates and whereby the position of the axis of rotation of the planet gear changes relative to the axis of rotation of the motor shaft as the planet gear rotates such that the varying position of the axis of rotation of the planet gear defines a circle centered on the axis of rotation of the motor shaft, said circle having a radius equal to the predetermined amount.

2. The pedal driven apparatus of claim 1, wherein the axis of rotation of the pedal and the axis of rotation of the motor shaft are parallel.

3. The pedal driven apparatus of claim 1, wherein the first torque transmission path comprises the manually operable pedals, the pedal spindle to which the manually operable pedals are affixed for rotation therewith, and the first one way drive means, wherein the first one way drive means mechanically couples the pedal spindle to the sprocket such that the first one way drive means transfers the manually provided driving force applied to the manually operable pedals to the sprocket to cause rotation of the sprocket and wherein the first one way drive means allows the pedal spindle to freewheel when the sprocket is being driven by the motor shaft.

4. The pedal driven apparatus of claim 3, wherein the first one way drive means is associated with one of the manually operable pedals affixed to the pedal spindle for rotation therewith, said one of the manually operable pedals comprising one of two manually operable pedals which is affixed to an end of the pedal spindle on a sprocket side of the pedal driven apparatus.

5. The pedal driven apparatus of claim 1, wherein the planet gear has a smaller diameter than an internal diameter of an internal ring gear within which it locates for rotation there within, the internal ring gear being fixed in position and having a central axis co-incident with the axis of rotation of the motor shaft, the planet gear having a smaller number of teeth than the internal ring gear.

6. The pedal driven apparatus of claim 5, wherein a planet gear carrier of the planetary gear mechanism is configured to transfer the motor provided driving force to the sprocket.

7. The pedal driven apparatus of claim 6, wherein the planet gear carrier is affixed to the sprocket for rotation therewith.

8. The pedal driven apparatus of claim 7, wherein the planet gear carrier is also affixed to an output member of the first one way drive means for rotation therewith, whereby the manually provided driving force applied to the manually operable pedals is transferred via the first torque transmission path to the motor shaft through the planetary gear mechanism as well as to the sprocket.

9. The pedal driven apparatus of claim 8, wherein the toothless planet gear is rotatably supported on an eccentric wheel whereby the toothless planet gear is made to rotate as the eccentric wheel rotates and whereby the position of the axis of rotation of the toothless planet gear changes relative to the axis of rotation of the motor shaft as the toothless planet gear rotates such that the varying position of the axis of rotation of the toothless planet gear defines a circle centered on the axis of rotation of the motor shaft, said circle having a radius equal to the predetermined amount.

10. The pedal driven apparatus of claim 9, wherein the toothless internal ring gear is fixed in position and has a central axis co-incident with the axis of rotation of the motor shaft.

11. The pedal driven apparatus of claim 10, wherein a planet gear carrier of the toothless planetary gear mechanism is configured to transfer the motor provided driving force to the sprocket.

12. The pedal driven apparatus of claim 9, wherein the toothless planet gear is rotatably supported on the eccentric wheel with its axis of rotation is offset by a predetermined amount with respect to the axis of rotation of the motor shaft and located within the toothless internal ring gear to engage a toothless inner ring gear surface by heating the toothless internal ring gear and shrink fitting it over the toothless planet gear.

13. The pedal driven apparatus of claim 11, wherein the planet gear carrier is affixed to the sprocket for rotation therewith.

14. The pedal driven apparatus of claim 13, wherein the planet gear carrier is also affixed to an output member of the first one way drive means for rotation therewith, whereby the manually provided driving force applied to the manually operable pedals is transferred via the first torque transmission path to the motor shaft through the toothless planetary gear mechanism as well as to the sprocket.

15. The pedal driven apparatus of claim 1, wherein the planetary gear mechanism includes a counterbalance member which is configured to counterbalance an imbalance of weight caused by the offsetting of the planet gear with respect to the axis of rotation of the motor shaft.

16. The pedal driven apparatus of claim 1, wherein the planetary gear mechanism does not include a weighted counterbalance member, but comprises first and second identical planet gears arranged half a revolution out of phase with each other such that said first and second planet gears counterbalance each other on rotation.

17. The pedal driven apparatus of claim 16, wherein the first and second planet gears are located for rotation half a revolution out of phase with each other within a common, single internal ring gear.

18. The pedal driven apparatus of claim 1 wherein a second one way drive means is provided in the second torque transmission path between the motor shaft and the sprocket such that when the sprocket is being driven by the manually provided driving force through the first torque transmission path, the motor shaft is not caused to rotate.

19. The pedal driven apparatus of claim 18, wherein the second one way drive means comprises at least one ratchet member moveably disposed on the planet gear carrier and arranged to engage a rack of a ratchet wheel fixed to rotate with the sprocket.

20. The pedal driven apparatus of claim 1, wherein the pedal driven apparatus comprises a bicycle.

21. A pedal driven apparatus comprising:
manually operable pedals fixed for rotation with a pedal spindle for receiving a manually provided driving force;
a motor having a motor shaft for receiving a motor provided driving force; wherein the motor is arranged concentrically around the pedal spindle such that the pedal spindle is freely accommodated through a hollow bore of the motor shaft, the motor shaft supported by a bearing on a casing of the pedal driven apparatus; the pedal spindle and the motor shaft sharing the same axis of rotation;
a first torque transmission path for transferring the manually provided driving force to a sprocket of the pedal driven apparatus;
a second torque transmission path for transferring the motor provided driving force to said sprocket of the pedal driven apparatus;
wherein a first one way drive means is provided in the first torque transmission path between the pedal spindle and the sprocket such that when the sprocket is being driven by the motor provided driving force through the second torque transmission path, the pedal spindle is able to freewheel, wherein the second torque transmission path comprises the motor shaft and a gear mechanism mechanically coupling the motor shaft to the sprocket, wherein the gear mechanism has a reduction gear ratio and operates to transfer the motor provided driving force from the motor shaft to the sprocket at said reduction gear ratio, wherein the gear mechanism comprises a toothless planetary gear mechanism having a toothless planet gear whose axis of rotation is offset by a predetermined amount with respect to the axis of rotation of the motor shaft and wherein the reduction gear ratio of the toothless planetary gear mechanism is defined by a relationship between the respective diameters of the toothless planet gear and a toothless internal ring gear within which the planet gear is located for rotation, the toothless planet gear having a smaller diameter than the toothless internal ring gear.

22. The pedal driven apparatus of claim 21, wherein the toothless planetary gear mechanism includes a counterbalance member which is configured to counterbalance an imbalance of weight caused by the offsetting of the toothless planet gear with respect to the axis of rotation of the motor shaft.

23. The pedal driven apparatus of claim 21, wherein the toothless planetary gear mechanism does not include a weighted counterbalance member, but comprises first and second identical toothless planet gears arranged half a revolution out of phase with each other such that said first and second toothless planet gears counterbalance each other on rotation.

24. The pedal driven apparatus of claim 23, wherein the first and second toothless planet gears are located for rotation half a revolution out of phase with each other within a common, single toothless internal ring gear.

25. The pedal driven apparatus of claim 23, wherein the first and second toothless planet gears are rotatably supported respectively on the first and second eccentric wheels with their axes of rotation offset by a predetermined amount with respect to the axis of rotation of the motor shaft and located within a common, single toothless internal ring gear for rotation half a revolution out of phase with each other to engage a toothless inner ring gear surface by heating the toothless internal ring gear and shrink fitting it over the first and second toothless planet gears.

26. A motor for a pedal driven apparatus comprising:
a shaft for receiving a motor provided driving force; and
a gear mechanism mechanically coupling the motor shaft to a sprocket of the pedal driven apparatus, wherein the gear mechanism has a reduction gear ratio and operates to transfer the motor provided driving force from the motor shaft to the sprocket at said reduction gear ratio and
wherein the motor is arranged concentrically around a pedal spindle of the pedal driven apparatus such that the pedal spindle is freely accommodated through a hollow bore of the motor shaft and such that their axes of rotation are parallel, the motor shaft supported by a bearing on a casing of the pedal driven apparatus; the pedal spindle and the motor shaft sharing the same axis of rotation;
wherein the gear mechanism comprises a planetary gear mechanism having a planet gear whose axis of rotation is offset by a predetermined amount with respect to the axis of rotation of the motor shaft; the planet gear being rotatably supported on an eccentric wheel whereby the planet gear is made to rotate as the eccentric wheel rotates and whereby the position of the axis of rotation of the planet gear changes relative to the axis of rotation of the motor shaft as the planet gear rotates such that the varying position of the axis of rotation of the planet gear defines a circle centered on the axis of rotation of the motor shaft, said circle having a radius equal to the predetermined amount.

27. A sprocket assembly for a pedal driven apparatus, comprising:
a sprocket;
first means for mechanically coupling the sprocket to a pedal driven pedal spindle; and second means for mechanically coupling the sprocket to an output shaft of a motor, wherein the first mechanical coupling means includes a first one way drive means coupling the pedal spindle and the sprocket such that the first one way drive means transfers a manually provided driving force applied to the pedals of the pedal driven apparatus to the sprocket to cause rotation of the sprocket and allows the pedal spindle to freewheel when the sprocket is being driven by the output shaft of the motor, the output shaft of the motor being supported by a bearing on a casing of the pedal driven apparatus; the pedal spindle and the output shaft of the motor sharing the same axis of rotation;
wherein the second means comprising a gear mechanism mechanically coupling the output shaft of the motor to the sprocket, the gear mechanism having a reduction gear ratio and operates to transfer the motor provided driving force from the output shaft to the sprocket at said reduction gear ratio; the gear mechanism comprising a planetary gear mechanism having a planet gear whose axis of rotation is offset by a predetermined amount with respect to the axis of rotation of the output shaft; the planet gear being rotatable supported on an eccentric wheel whereby the planet gear is made to rotate as the eccentric wheel rotates and whereby the position of the axis of rotation of the planet gear changes relative to the axis of rotation of the output shaft as the planet gear rotates such that the varying position of the axis of rotation of the planet gear defines a circle centered on the axis of rotation of the output shaft, said circle having a radius equal to the predetermined amount.

* * * * *